(12) United States Patent
Das et al.

(10) Patent No.: US 12,041,302 B2
(45) Date of Patent: Jul. 16, 2024

(54) SYSTEM AND METHOD FOR OBTAINING VIEWER DEMOGRAPHIC DATA FROM A SET-TOP BOX

(71) Applicant: Star India Private Limited, Mumbai (IN)

(72) Inventors: Kaushik Das, Mumbai (IN); Rahul Patil, Nashik (IN); Tejaswi Bonda, Hyderabad (IN); Akhtar Jalaludheen, Mumbai (IN); Nidhi Chadha, Delhi (IN)

(73) Assignee: STAR INDIA PRIVATE LIMITED, Mumbai (IN)

( * ) Notice: Subject to any disclaimer, the term of this patent is extended or adjusted under 35 U.S.C. 154(b) by 3 days.

(21) Appl. No.: 18/045,547

(22) Filed: Oct. 11, 2022

(65) Prior Publication Data
US 2023/0111869 A1 Apr. 13, 2023

(30) Foreign Application Priority Data
Oct. 12, 2021 (IN) .............................. 202121046387

(51) Int. Cl.
| | | |
|---|---|---|
| H04N 21/442 | (2011.01) | |
| H04N 21/422 | (2011.01) | |
| H04N 21/4415 | (2011.01) | |
| H04N 21/45 | (2011.01) | |

(52) U.S. Cl.
CPC . *H04N 21/44204* (2013.01); *H04N 21/42203* (2013.01); *H04N 21/4415* (2013.01); *H04N 21/4532* (2013.01)

(58) Field of Classification Search
CPC ....... H04N 21/44204; H04N 21/42203; H04N 21/4415; H04N 21/4532
See application file for complete search history.

(56) References Cited

U.S. PATENT DOCUMENTS

| | | | |
|---|---|---|---|
| 2016/0119672 A1* | 4/2016 | Alonso | H04N 21/4728 725/19 |
| 2018/0184157 A1* | 6/2018 | Newell | H04N 21/4756 |
| 2020/0107071 A1* | 4/2020 | Doshi | H04N 21/44204 |

OTHER PUBLICATIONS

U.S. Appl. No. 17/905,489, entire non-provisional application as filed Sep. 1, 2022.

* cited by examiner

Primary Examiner — Kyu Chae
(74) Attorney, Agent, or Firm — Kwan & Olynick LLP

(57) ABSTRACT

Various embodiments of the present disclosure provide a method and a system for obtaining enriched channel tracking data from a set-top box (STB). Channel information associated with channels viewed by at least one viewer on a display device associated with the STB is accessed. It is determined whether the microphone has captured one or more voice signals in vicinity of the STB prior to detection of an occurrence of a predefined event. Further, voice biometric data is extracted from each captured voice signal to configure viewer demographic data when the microphone has captured the one or more voice signals. The viewer demographic data is configured based at least on identifying viewer information corresponding to the voice biometric data. The viewer demographic data is correlated with channel tracking data corresponding to the detected predefined event to generate a payload. The data packet including the payload is transmitted to a remote server.

20 Claims, 8 Drawing Sheets

| VIEWER IDENTIFIER 402 | VIEWER AGE 404 | VIEWER GENDER 406 | AVERAGE VIEWER PITCH 408 | VIEWER VOICE BIOMETRIC 410 |
|---|---|---|---|---|
| 05A0036 | 40-50 | MALE | 85Hz | |
| 05A0037 | 30-40 | FEMALE | 160Hz | |
| 05A0038 | 8-12 | MALE | 120Hz | |

FIG. 4

SYSTEM AND METHOD FOR OBTAINING VIEWER DEMOGRAPHIC DATA FROM A SET-TOP BOX

CROSS-REFERENCE TO RELATED APPLICATIONS

This application claims priority from Indian provisional patent application 202121046387, filed Oct. 12, 2021, which is incorporated herein in its entirety by this reference thereto.

TECHNICAL FIELD

The present technology generally relates to set-top boxes (STBs), more particularly, to a system and method for obtaining viewer demographic data from an STB.

BACKGROUND

Television (TV) is a popular choice for viewing a variety of content, such as entertainment content, news-related content, commercial advertisements, and the like. The content being viewed on the TV by the viewers may be tracked via respective set-top boxes (STBs) to generate channel tracking data. The channel tracking data may be transmitted from the respective STBs to a remote server, which may be configured to generate statistical information such as, for example, the number of viewers viewing a particular channel, duration of viewing various channels, number of viewers viewing an advertisement (also referred to herein as 'Ad'), and the like. The statistical information may be used to provide meaningful insights into viewership patterns to the stakeholders, such as a broadcaster, a producer, an advertiser, or an advertising agency. In an illustrative example, broadcasters and production houses may wish to determine the type of content that may be of interest to the viewers and the statistical information may assist the stakeholders to customize their content. In another illustrative example, advertisers may wish to choose one Ad among several Ads and the statistical information may assist the advertisers in selecting the Ad to enable the advertisers to achieve a higher success rate. More specifically, the selection of Ads and content and their subsequent customization may be performed based on the statistical information generated from the channel tracking data received from the STBs.

Conventionally, the channel tracking data received from an STB represents an entire household. More specifically, the channel tracking data for an individual household does not provide any information related to the viewer demographics within a household. In one illustrative example, kids in a household may spend evenings watching wildlife-related content, and adults in the households may watch reality shows at night. Accordingly, the channel tracking data may only indicate that the viewers of the household view wildlife-related content and reality shows. Without the viewer demographic information, such as the number of different individuals in a household, the age and/or gender information of the individual viewers watching different media content on the TV, and the like, the provisioning of targeted content and Ads may not be as effective as desired. Moreover, conventional systems transmit channel tracking data from the STB to remote entities (e.g., cable/DTH providers) using cellular and/or Wi-Fi communication protocols, which cause the STB to consume a significant amount of power and are also prohibitively expensive.

Accordingly, there is a need to increase the effectiveness of the targeted content/Ads to be provided to individual viewers of a household. Further, there is a need to enhance channel tracking data with viewer demographic data to improve the quality of channel tracking data collated from a plurality of STBs. Furthermore, it would be advantageous to employ a low-cost, low-power mechanism for transmitting the channel tracking data with the viewer demographic data over long distances to enable viewership measurement at scale.

SUMMARY

Various embodiments of the present disclosure describe a system and a method for obtaining viewer demographic data from an STB.

In an embodiment, a method performed by a system for obtaining enriched channel tracking data from a set-top box (STB) is disclosed. The method includes accessing channel information associated with channels viewed by at least one viewer on a display device associated with the STB. Occurrence of a predefined event is detected based at least on the channel information. It is determined whether a microphone associated with the system has captured one or more voice signals in vicinity of the STB during a predefined time period prior to the detection of the predefined event, in response to detection of occurrence of the predefined event. Further, voice biometric data is extracted from each captured voice signal of the one or more voice signals to configure viewer demographic data upon a determination that the microphone has captured the one or more voice signals. The viewer demographic data is configured based at least on identifying viewer information corresponding to the voice biometric data. Further, the method includes correlating the viewer demographic data with channel tracking data corresponding to the detected predefined event to generate a payload. Thereafter, the method includes transmitting the data packet including the payload to a remote server.

In an embodiment, a system for obtaining channel tracking data from a set-top box (STB) is disclosed. The system includes a memory module for storing instructions, a communication module, and a processing module configured to execute the instructions and thereby cause the system to at least access channel information associated with channels viewed by at least one viewer on a display device associated with the STB. The processing module detects an occurrence of a predefined event based at least on the channel information. Further, the processing module determines whether a microphone of the system has captured one or more voice signals in vicinity of the STB during a predefined time period prior to detection of the predefined event, in response to a detection of occurrence of the predefined event. The system is further caused to extract voice biometric data from each captured voice signal of the one or more voice signals to configure viewer demographic data upon a determination that the microphone has captured the one or more voice signals. The viewer demographic data is configured based at least on identifying viewer information corresponding to the voice biometric data. Further, the system is caused to correlate the viewer demographic data with channel tracking data corresponding to the detected predefined event to generate a payload. Thereafter, the system is caused to transmit, via the communication module, the data packet to a remote server.

BRIEF DESCRIPTION OF THE FIGURES

The advantages and features of the invention will become better understood with reference to the detailed description taken in conjunction with the accompanying drawings, wherein like elements are identified with like symbols, and in which:

FIG. 4 shows a snapshot of a simplified tabular representation for illustrating viewer profiles stored in an STB, in accordance with an embodiment of the invention;

Figure 1:
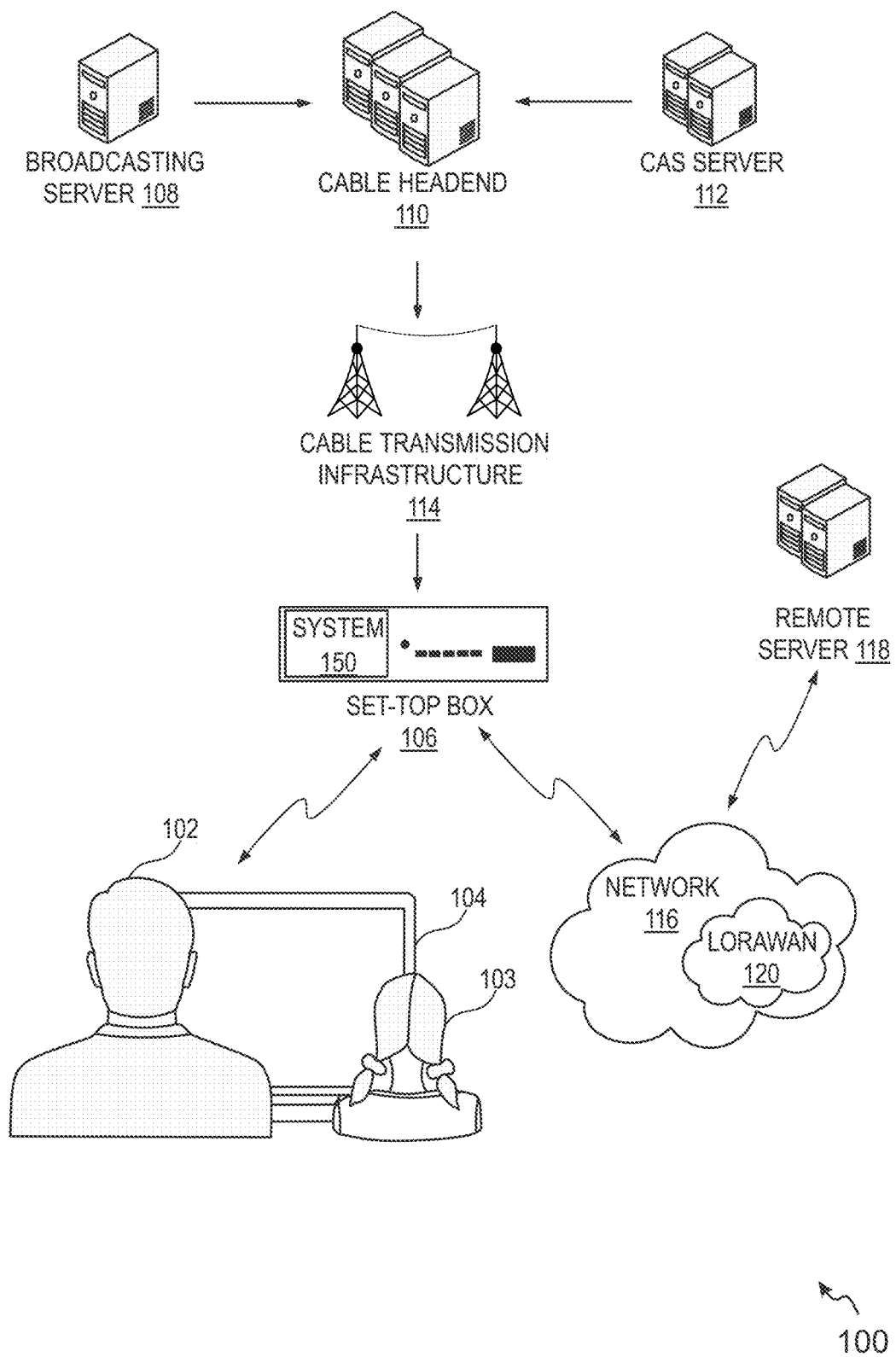
FIG. 1 shows an illustration of an example environment relevant to at least some embodiments of the present invention.

The drawings referred to in this description are not to be understood as being drawn to scale except if specifically noted, and such drawings are only exemplary in nature.

DETAILED DESCRIPTION

The best and other modes for carrying out the present invention are presented in terms of the embodiments, herein depicted in FIGS. 1 to 8. The embodiments are described herein for illustrative purposes and are subject to many variations. It is understood that various omissions and substitutions of equivalents are contemplated as circumstances may suggest or render expedient but are intended to cover the application or implementation without departing from the spirit or scope of the invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

The term "channel switching event" as used herein refers to a viewer changing a channel currently viewed by him/her on a display device. The channel being viewed on the display device can be switched using physical buttons, remote control, remote application installed on a viewer device or hand gestures. In other words, the channel switching event indicates that the viewer has switched his/her view from one channel to another channel.

Overview

Current solutions for channel tracking data include the public or private entities determining and publishing viewership data for a particular channel or content either weekly or monthly or annually. Further, the viewership data provided by these entities is not accurate and not in real-time or near real-time, thereby restricting usage of this data for ranking of content and amount of viewership for particular content. Further, the viewership data provided by these entities do not include any characteristics of the viewers of the content.

Various embodiments of the present invention provide a method and a system for obtaining channel tracking data including viewer demographic data from a set-top box (STB). As per the proposed method, channels being viewed by a viewer on a display device are monitored to determine if any channel switching event or an STB event has occurred. The STB may include a microphone that is triggered to capture voice signals nearby the STB when there is an occurrence of the channel switching event or the STB event. The voice signals are processed to extract voice biometric data that facilitates identification of viewer information of the channels. The viewer information includes characteristics of the viewer such as age, gender, and voice sample. The viewer information of all the voice signals is accumulated as viewer demographic data that is combined with channel tracking data. The channel tracking data corresponds to the channel switching event. In other words, the channel tracking data may correspond to the channel being watched when a voice signal is captured. Further, the combined data is included in a payload and transmitted to remote entities in a data packet using a low range and less power consumption communication protocol (such as LoRaWAN protocol).

The channel tracking data combined with viewer demographic data is determined in real-time and is accurate, which helps the entities (such as content providers and advertising agencies) to use this combined data to customize advertisements and content provided to end-users or customers viewing content. Obtaining channel tracking data enriched with viewer demographic data is further explained with reference to FIGS. 1 to 8.

FIG. 1 shows a representation 100 for illustrating an example environment relevant to at least some embodiments of the present invention.

As an example, the representation 100 depicts two viewers, viewer 102 and viewer 103, of a household engaged in viewing content (not shown in FIG. 1) being displayed on a television (TV) set 104. In one illustrative example, the viewer 102 is a middle-aged male and the viewer 103 is a girl child. The TV set 104 is hereinafter referred to as TV 104. The TV 104 is configured to display digital media content in the form of high-definition (HD) video and/or standard-definition (SD) video to the viewers, such as the viewer 102 and the viewer 103. The TV 104 is depicted to be in operative communication with a set-top box (STB) 106. For example, the TV 104 may be connected to the STB 106 using an Audio/Video (AV) connection or a High-Definition Multimedia Interface (HDMI) connection. The STB 106 is configured to decode TV signals received from terrestrial sources (such as cable TV infrastructure) or extraterrestrial sources (such as satellites) and transmit the decoded TV signals to the TV 104. The signals decoded by the STB 106 may be presented as channel content to the viewers by the TV 104.

The representation 100 further depicts a broadcasting server 108, which is configured to receive digital media content, such as SD video or HD video, from the broadcasters, content producers, and/or the cable system operators. Some non-limiting examples of digital media content may include news content, sports-related content, entertainment content, and the like. The broadcasting server 108 transmits the digital media content to a cable headend 110.

The cable headend 110 is configured to decode, multiplex, re-encode the received digital media content from the broadcasting server 108 and transmit the re-encoded digital media content to a cable transmission infrastructure 114. The cable headend 110 is depicted to be in operative communication with a conditional access sequence (CAS) server 112. The CAS server 112 is configured to generate entitlement control messages (ECMs) and provide the ECMs to the cable headend 110. The ECMs are transmitted along with digital media content by the cable headend 110 to the cable transmission infrastructure 114. The ECM is configured to facilitate conditional access to the digital media content, i.e. only authorized subscribers can access the digital media content. The cable transmission infrastructure 114 transmits the digital media content along with the corresponding ECMs to STBs, such as the STB 106. In at least one embodiment, the digital media content and the corresponding ECMs transmitted to the STBs are embodied as signals, referred to hereinafter as TV signals.

It is noted that the cable transmission infrastructure 114 may utilize relevant standards and protocols, such as those related to at least one of digital video broadcasting (DVB), advanced television systems committee (ATSC), integrated services digital broadcasting (ISDB), Digital Terrestrial Multimedia Broadcast (DTMB), digital TV standards for mobile and fixed terminals, and the like, for transmission of content to the STBs. It is also noted that though the standards mentioned above are relevant for the broadcast transmission of digital television over cable, in some embodiments, the digital media content may be transmitted to the STBs over non-cable infrastructures, such as fiber or satellite infrastructure, and accordingly, relevant standards and protocols applicable to such infrastructures may be utilized for transmission purposes.

The STB 106 is configured to decode television signals received from the cable transmission infrastructure 114 and present the decoded signals as digital content to the viewers through the TV 104 in the form of channels. The STB 106 may be monitored for obtaining channel tracking data such as, for example, channels viewed on the TV 104, duration of viewing of the channels, and the like. The channel tracking data may be transmitted over a communication network, such as a network 116, to a remote server 118. The remote server 118 may be embodied as one of a network server, an application server, and the like. The network 116 may include wired networks, wireless networks, and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of a combination of wired and wireless networks may include the Internet.

In one embodiment, the remote server 118 embodied as an application server is configured to collate channel tracking data obtained from the STBs, such as the STB 106, to generate statistical information, such as but not limited to, viewership by a particular channel, a show, a sports event, or even an advertisement (Ad) spot, viewership by a timeslot, viewership by a market, and the like. The statistical information may be generated in real-time and tracked for use by stakeholders (e.g., broadcasters, advertising agencies) for selecting content (e.g., commercial Ads, characters, and content genres) and customizing content for viewing customers. For example, advertisers may use the channel tracking data for generating targeted advertising campaigns, and the like. In some example embodiments, the channel tracking data collated from a plurality of households is used to generate viewership data. The viewership data may provide an accurate reflection of the composition of the national TV audience in each market and may assist the stakeholders to determine the type of content that may be of interest to viewers.

However, the channel tracking data from an individual household does not provide any information related to viewer demographics within a household. For example, the channel tracking data only indicates that news-related content, cartoon content, and entertainment content were watched by the individual household. The channel tracking data neither specifically identifies individuals of the household who watched the news-related content, the cartoon content, and the entertainment content nor does it indicate the gender or age of individual viewers of these content types. Further, different individuals within the household may view single or multiple content types on the TV 104 throughout the day. Furthermore, the preferences of a viewer may change over time. For example, adults may follow more news-related content over entertainment content during a humanitarian crisis event, such as the pandemic. Kids may watch more entertainment content as they spend more time indoors during the pandemic. In absence of such viewer demographic data, stakeholders may not be able to derive meaningful insights from the channel tracking data and as such, the targeting of content and Ads to the household may not be as effective as desired. Moreover, conventional systems that capture channel tracking data such as automatic content recognition (ACR), people meter, and return path data (RPD) measurement systems typically utilize existing cellular and/or Wi-Fi communication protocols to transmit the subscriber logs to the cable/DTH operators which are prohibitively expensive and use a high amount of power compared to proposed Low power low Range Wide Area Network (LoRaWAN) protocol in transmitting the channel tracking data to remote entities.

To overcome the aforementioned drawbacks and provide additional advantages, a system 150 for obtaining channel tracking data enriched with viewer demographic data from a set-top box, such as the STB 106, is provided. The system 150 is configured to facilitate the transmission of the channel tracking data including the viewer demographic data over a Low power low Range Wide Area Network (LoRaWAN) 120 to the remote server 118. The system 150 is explained in further detail with reference to FIG. 2.

Figure 2:
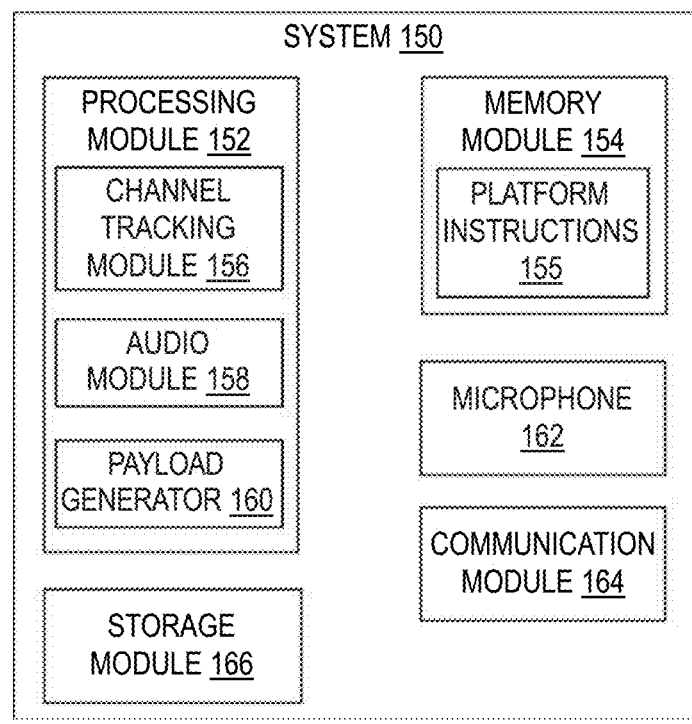
FIG. 2 is a block diagram of a system configured to obtain channel tracking data from an STB associated with an individual household, in accordance with an embodiment of the invention.

FIG. 2 is a block diagram of a system 150 configured to obtain viewer demographic data from a set-top box (STB), in accordance with an embodiment of the invention. In at least one embodiment, the system 150 may be included within an STB, such as the STB 106 shown in FIG. 1. In some embodiments, the system 150 may be disposed external to the STB 106 but within vicinity of the STB 106 and configured to be in operative communication with the STB 106. For example, the STB 106 and system 150 are in communication with each other through wired or wireless means and both are placed nearer to the display device such as the TV 104.

As explained with reference to FIG. 1, the STB 106 is configured to transmit channel tracking data to a remote server, such as the remote server 118 shown in FIG. 1. The term 'channel tracking data' as used herein primarily implies the data that may be used to track viewing of channels by individuals in a household associated with the STB 106. In at least some embodiments, the channel tracking data includes information related to channels viewed by the individuals within the household. Such channel-related information may include, but not limited to, a channel identifier and duration of viewing the channel. The channel tracking data may also include channel specific information, such as data related to the frequency of channel switching, a sequence of channels viewed, a preference of time slots for channel viewing, and the like.

The system 150 is configured to enrich the channel tracking data with viewer demographic data. More specifically, the system 150 is configured to add demographic information related to channels viewed by individuals (i.e., viewers) of a household to the channel tracking data. The viewer demographic data may include information related to a number of viewers viewing a respective channel being displayed on the TV 104, characteristics of each viewer (e.g., age, gender, etc.), a viewer preference of time slots for channel viewing, and the like. It is noted that the term 'obtaining viewer demographic data from the STB' as used herein implies receiving the channel tracking data enriched with viewer demographic data from the STB 106, which involves the generation of data packets including the payload corresponding to the channel tracking data and the viewer demographic data at the STB 106, and the transmission of the data packets from the STB 106 using a transmission protocol that ensures low cost, low power transmission to a remote processing server, such as the remote server 118 shown in FIG. 1. In one embodiment, the system 150 may include an advertisement/content customization module (not shown) configured to customize content and advertisements presented to the viewer of the TV 104 based on the channel tracking data and the viewer demographic data. For example, the ad module may replace the advertisements in the content based on the interests of the viewer, where the interests are determined from the viewer demographic data. In another embodiment, the STB 106 may include a module (not shown) to customize the content and advertisements provided to the TV 104. For example, upon determining the viewer demographic data, the system 150 may insert targeted advertisements in the content displayed on the TV based on viewer demographic data such as the viewer's age and gender. For example, advertisements related to chocolates can be displayed on the TV 104, when it is determined kids are watching the content on the TV 104. In another embodiment, the system 150 may display a survey on the TV 104 to obtain viewers' interests and customize the advertisements based on the survey results. For example, the viewer may be displayed a question and options on the TV 104 related to the kind of sports he would like to watch. The viewer may select one or more options (such as cricket and tennis) based on which advertisements to be displayed on the TV 104 are customized at the system 150 or STB 106.

The system 150 is depicted to include a processing module 152 and a memory module 154. It is noted that although the system 150 is depicted to include only one processing module, the system 150 may include more number of processing modules therein. In an embodiment, the memory module 154 is capable of storing machine-executable instructions, referred to herein as platform instructions 155. Further, the processing module 152 is capable of executing the platform instructions 155.

In an embodiment, the processing module 152 may be embodied as a multi-core processor, a single-core processor, or a combination of one or more multi-core processors and one or more single-core processors. For example, the processing module 152 may be embodied as one or more various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 152 may be configured to execute hard-coded functionality. In an embodiment, the processing module 152 is embodied as an executor of software instructions, wherein the instructions may specifically configure the processing module 152 to perform the algorithms and/or operations described herein when the instructions are executed. The processing module 152 is further depicted to include a channel tracking module 156, an audio module 158, and a payload generator 160. The modules of the processing module 152 may be implemented as software modules, hardware modules, firmware modules, or as a combination thereof.

The memory module 154 may be embodied as one or more volatile memory module devices, one or more non-volatile memory devices, and/or a combination of one or more volatile memory devices and non-volatile memory devices. For example, the memory module 154 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read-only memory), CD-R (compact disc recordable), CD-R/W (compact disc rewritable), DVD (Digital Versatile Disc) and BD (BLU-RAY® Disc).

In at least some embodiments, the memory module 154 may store instructions or logic for detecting an occurrence of predefined events, extracting speech features from voice signals, determining the voice biometric from the speech features, generating a payload based on viewer demographic data and channel tracking data, and generating a data packet based on LoRaWAN protocol. The memory module 154 also includes one or more machine learning models for predicting likelihood estimates as will be explained later with reference to FIGS. 3 and 4.

The system 150 also includes a sound capturing module in the form of a microphone (shown as microphone 162 in FIG. 2) and at least one communication module (shown as communication module 164 in FIG. 2). In one embodiment, the microphone 162 can be located external to the system 150 and can be in communication with the system 150 through the communication module 164. For example, the system 150 may be connected to a microphone present in an external device (such as TV remote, smart voice assistants, etc.), which listens to the audio in vicinity of the STB 106. The microphone 162 is capable of capturing voice signals in the vicinity of the STB 106 associated with the system 150. The term 'voice signal' as used herein refers to an audio signal representation of sound waves corresponding to human speech and accordingly, may include speech or audio signals corresponding to the voice input of individuals (i.e., viewers) watching a channel on a display device associated with the STB 106 such as the TV 104. For example, audio signal representation (e.g. analog representation) of a viewer's voice expressing some opinion or the viewer's reactions to content being displayed on the TV 104, voice commands to perform an action (e.g., switch from one channel to another channel) or a conversation between two individuals of the household (e.g., the viewer 102 and the viewer 103 shown in FIG. 1) may configure the voice signal captured by the microphone 162.

In some embodiments, the microphone 162 may also be programmed to remain in an ON state after powering ON of the STB 106 till the STB 106 is powered OFF. Alternatively, to conserve power, in at least some embodiments, the microphone 162 may be pre-programmed to be powered ON for short time intervals, for example, one-two minute time durations, after detecting an occurrence of predefined events, such as switching ON of a television set/STB, passing off of a threshold amount of time (for example, 1 minute) after a channel is being selected for viewing without switching to another channel, or, immediately after a channel switching event. It is noted that, in at least some embodiments, the voice signals captured in the vicinity of the STB 106 are presumed to be originating from viewers of the content being displayed on the TV 104 associated with the STB 106.

The communication module 164 is configured to facilitate communication between the system 150 and the components of the STB 106. Further, the communication module 164 may include communication circuitry such as for example, a transceiver circuitry including an antenna and other communication media interfaces to connect to a wired and/or wireless communication network. The communication circuitry associated with the communication module 164 may, in at least some example embodiments, enable transmission of data signals and/or reception of signals from remote network entities, such as the remote server 118 shown in FIG. 1.

The system 150 is further depicted to include a storage module 166. The storage module 166 is any computer-operated hardware suitable for storing and/or retrieving data. In one embodiment, the storage module 166 is configured to store one or more account profiles of TV viewers associated with a household. Further, the storage module 166 is configured to store one or more viewer profiles associated with TV viewers in the household. Each viewer profile may further include information related to the viewer's characteristics (such as the viewer's age and gender) and the viewer's voice biometrics. The storage of viewer profiles is explained in detail with reference to FIG. 4. The storage module 166 may include one or more storage units such as hard drives and/or solid-state drives in a redundant array of inexpensive disks (RAID) configuration. In some embodiments, the storage module 166 may include a storage area network (SAN) and/or a network attached storage (NAS) system. In some embodiments, the processing module 152 and/or other components of the processing module 152 may access the storage module 166 using a storage interface (not shown in FIG. 2). The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing module 152 and/or the modules of the processing module 152 with access to the storage module 166.

It is noted that although the system 150 is depicted to include the processing module 152, the memory module 154, the microphone 162, the communication module 164, and the storage module 166, in some embodiments, the system 150 may include more or fewer components than those depicted herein. The various components of the system 150 may be implemented using hardware, software, firmware or any combinations thereof. Further, the various components of the system 150 may be operably coupled with each other. More specifically, various components of the system 150 may be capable of communicating with each other using communication channel media (such as buses, interconnects, etc.).

The functionalities performed by the various modules of the processing module 152, such as the channel tracking module 156, the audio module 158, and the payload generator 160 for facilitating the obtaining of viewer demographic data from the STB 106 are explained in detail hereinafter.

In at least some embodiments, the channel tracking module 156 in conjunction with the instructions in the memory module 154 is configured to monitor channels viewed on a display device such as the TV 104 and detect an occurrence of predefined events, such as a channel being viewed (without switching) for more than a threshold amount of time (e.g., one-two minutes), a channel switching event, an STB ON/Reset event and the like. In one embodiment, the channel tracking module 156 in conjunction with the instructions in the memory module 154 is configured to monitor the channels by accessing channel information corresponding to the channels being viewed on the TV 104, the channel information may include information related to an identity of the channel being viewed (such as channel ID and channel name) and characteristics of the channel (such as the category of the channel and time elapsed by watching the channel). On detecting occurrences of the predefined event, the channel tracking module 156 is configured to capture channel-related information (such as the channel ID, Channel Start viewing time, viewing duration, and the like) in relation to the detected event. Upon detection of the occurrences of the predefined event, the processing module 152 is configured to determine whether the microphone 162 has captured voice signals during a time period prior to the detection of the predefined event. For example, microphone 162 is switched ON upon switching ON the STB 106 and the microphone 162 is configured to capture voice signals at time instances between periodic intervals. In one embodiment, the microphone 162 captures voice signals in the vicinity of the TV 104 for every five minutes. In other embodiments, the time period for capturing voice signals can be different than five minutes or predefined by the viewer or the service provider. In one embodiment, upon detection of the predefined event such as a channel switch, the processing module 152 checks whether the microphone 162 has captured voice signals prior to the channel switch. To that effect, the processing module 152 checks the microphone 162 to determine whether there was any recording made prior to the channel switch. For example, two viewers may be discussing to decide which channel to watch on the TV 104 and may have made a channel switch and during the discussion, the microphone 162 may have captured voice signals related to the discussion. These voice signals will be retrieved from the microphone 162 upon detection of the channel switch.

In case the processing module 152 determines that there is no recording made by the microphone 162, the channel tracking module 156 is configured to provide an indication to the microphone 162 upon detection of the occurrence of the predefined event. In cases where the microphone 162 is programmed to remain in the always-ON state from the power-ON state of the STB 106, the microphone 162, on receiving the indication from the channel tracking module 156 may initiate capturing of voice signals in the vicinity of the STB 106 at predefined time intervals. In cases, where the microphone 162 is not programmed to remain in the always- ON state from the power-ON state of the STB 106, the microphone 162 may first be switched ON and caused to initiate capturing of voice signals in the vicinity of the STB 106 at predefined time intervals. The one or more voice signals captured in the vicinity of the STB 106 in relation to the occurrence of a predefined event may be presumed to be related to the channel information captured in relation to the predefined event. For example, a voice signal captured in the vicinity of the STB 106 after a particular channel is being continuously watched for 5 minutes may be construed to be belonging to an individual of the household who is viewing the particular channel on the TV 104. Similarly, a voice signal captured in the vicinity of the STB 106 immediately after a channel switching event may be construed to be belonging to an individual of the household who is viewing the channel being displayed after the channel switching event. Accordingly, one or more voice signals may be captured in relation to various content types being viewed on the TV 104. In at least one embodiment, the captured one or more voice signals by the microphone 162 may be provided to the audio module 158.

The audio module 158 may be configured to process each voice signal to obtain viewer information in relation to the content being watched. The processing of the voice signal to determine viewer information by the audio module 158 is explained next with reference to FIG. 3.

Figure 3:
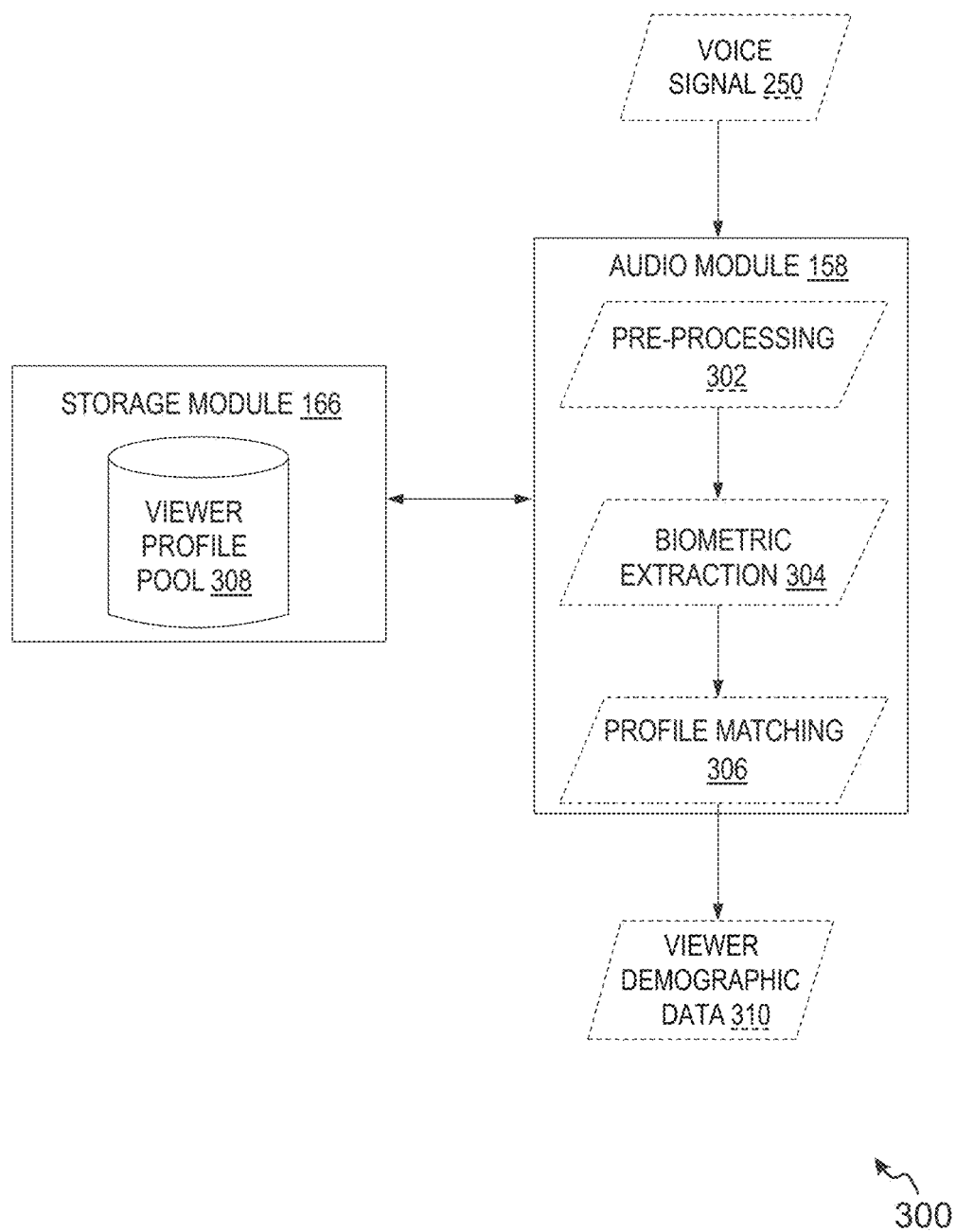
FIG. 3 depicts processing steps performed by the audio module of FIG. 2 for processing a voice signal, in accordance with an embodiment of the invention.

Referring now to FIG. 3, a representation 300 showing example processing steps performed by the audio module 158 of FIG. 2 for processing a voice signal is shown, in accordance with an embodiment of the invention.

As explained with reference to FIG. 2, one or more voice signals may be captured by the microphone 162 of the system 150 in relation to content being watched on the TV 104. The captured voice signals may be forwarded to the audio module 158. The audio module 158, in conjunction with instructions stored in the memory module 154, may be configured to determine viewer information by processing the captured voice signals. The processing of the voice signals is explained hereinafter with reference to a single voice signal, i.e., voice signal 250 in FIG. 3. It is understood that each voice signal may be similarly processed to facilitate obtaining the viewer demographic data. As explained with reference to FIG. 2, the term 'viewer demographic data' as used herein primarily includes information related to viewers of a household viewing a particular channel on a TV 104. For example, information such as a number of viewers in the household viewing a particular channel, the age/gender information of the viewers, and the like, may be captured corresponding to each channel content being viewed on the TV 104 in the household. Such captured information may represent viewer demographic data in relation to the respective channel content.

The processing of the voice signal 250 starts at 302. At 302, the voice signal 250 is subjected to a processing stage, referred to herein as 'pre-processing'. In one embodiment, the pre-processing step includes removal of background noise from the voice signal 250. For example, the sound from the content being viewed on the TV 104, electrical noise from nearby electronic appliances, animal sounds, traffic noise, etc., among other artifacts may be removed from the captured voice signal 250 using noise filters. The pre-processing step also includes transforming the voice signal 250. The transformation of the voice signal 250 may include pre-emphasis (e.g., boosting the amplitude of the speech signal) and digitization of the voice signal 250.

At 304, the pre-processed voice signal 250 is subjected to a processing stage, referred to herein as 'biometric extraction'. In the biometric extraction stage, speech features are extracted from the pre-processed voice signal 250, where the speech features may include power, pitch, etc. Further, the most relevant and important portions of the speech that uniquely identify an individual, i.e., configure a voice biometric data of a viewer, are determined. The voice biometric data is representative of anatomical and physiological characteristics of the viewer. Some examples of speech feature extraction techniques for determining the voice biometric from the voice signals may include Mel Frequency Cepstral Coefficient (MFCC), Discrete Wavelet Transform (DWT), Linear Prediction Cepstral Coefficients (LPCC), Line Spectral Frequencies (LSF), Perceptual Linear Prediction (PLP) and the like.

At 306, the audio module 158 executes a processing stage, referred to herein as 'profile matching'. In the profile matching stage, the audio module 158 compares the voice biometric data with stored biometric data corresponding to one or more viewer profiles stored in a viewer profile pool 308 in the storage module 166. If a match is identified, then the viewer with the matching voice biometric data is determined to be a viewer of the content being displayed on the TV 104. If a match is not identified, or in the case where no stored viewer profiles exist to facilitate matching of voice biometrics, the audio module 158 may be configured to create a new viewer profile and store the created viewer profile in the viewer profile pool 308.

In addition to storing voice biometric/biometric data with a created viewer profile, such as for example, 'viewer profile 1', the audio module 158 may also determine one or more viewer characteristics and store such viewer characteristics in the viewer profile. To this effect, the audio module 158 may include one or more classifiers. For example, a binary classifier may be used to categorize a gender of a viewer as 'male' or 'female' based on the pitch. For example, a pitch range for women is 150-500 Hz and 50-250 Hz for men. As such, a classifier may utilize appropriate pitch thresholds for classifying the viewer associated with the voice biometric as 'male' or 'female'. In another example, a classifier may be used to estimate the age of the viewer based on the voice biometric and further classify the viewer into an age group based on the estimated age. In one illustrative example, an adult viewing a soccer match on a sports channel may celebrate a goal by shouting 'GOAAAAL'. The voice signal of the viewer captured by the system 150 may aid in identifying viewer characteristics such as gender (i.e., male), 20-30 years old (i.e., age), and 150 Hz (i.e., pitch value). In addition, the audio module 158 queries the viewer through the TV 104 to provide relevant details of the viewer to create a viewer profile. For example, queries related to viewer details (such as age, gender, and content preferences) can be displayed on the TV 104 for the viewer to answer. Then, the audio module 158 may create the viewer profile based on the answers to the queries and the viewer voice biometric data, if the viewer profile corresponding to extracted voice biometric data is not present in viewer profile pool 308. It shall be noted that the viewer characteristics may include other information such as emotional state of the viewer, health condition of the viewer, and the like that may provide additional insights to the stakeholders in selecting content and/or Ads for customizing content provided to the viewer.

It is noted that viewer characteristics (such as age) may change over time. Further, the viewing preferences may also change over time. The audio module 158 may be capable of detecting changes in viewer behavior. For example, voice signal of a male child may change as he ages to a teenage male. Accordingly, the audio module 158 may be configured to update the viewer profile with new biometric and viewer characteristics or generate a new viewer profile altogether. An example representation of viewer profiles stored in the viewer profile pool 308 is shown in FIG. 4.

The identified viewer in relation to the content being viewed on the TV 104 may configure, at least in part, viewer demographic data 310 corresponding to the content. It is noted that more than one viewer in a household may simultaneously view a channel's content. In one illustrative example, a father and son may discuss the current political scenario while watching a news channel and as such, each voice signal may be processed separately to determine individual viewer characteristics. The individual viewer characteristics of viewers watching the display device such as the TV 104 may be collated together to constitute the viewer demographic data 310. In at least some embodiments, the viewer demographic data 310 of viewers watching a channel may be combined with channel tracking data (i.e., channel-related information) and transmitted to the payload generator 160 (shown in FIG. 2).

Referring now to FIG. 4, a portion of a simplified tabular representation 400 is shown for illustrating viewer profiles stored in the viewer profile pool 308 of the storage module 166, in accordance with an embodiment of the invention. It is understood that a representation in a tabular form is depicted for example purposes and that any data structure may be used for storing the viewer profile of the viewers.

In an illustrative example, a household may include three individuals who watch content on a display device, such as a TV 104, connected to an STB 106. As explained with reference to FIGS. 2 and 3, the system 150 included within the STB 106 is configured with the microphone 162, which captures voice signals in vicinity of the STB 106, when content is being displayed on the TV 104. The captured voice signals may be processed by the audio module 158 as explained with reference to FIG. 3 to identify viewer information. Further, as explained with reference to FIG. 3, a viewer profile may be maintained for each TV viewer of the household. Accordingly, the tabular representation 400 (hereinafter referred to as 'table 400') shows entries corresponding to three viewers. The table 400 is further explained below.

The table 400 depicts a plurality of columns such as columns 402, 404, 406, 408, and 410 which are associated with column headers 'Viewer Identifier', 'Viewer Age', 'Viewer Gender', 'Average Viewer pitch' and 'Viewer Voice Biometric', respectively. It is noted that the tabular representation 400 may include more or fewer number of columns than those depicted in FIG. 4. Moreover, viewer characteristics (e.g., viewer age, viewer gender, and average viewer pitch) represented by the columns 404, 406, 408 may not be limited to those depicted in the tabular representation 400 and, indeed a variety of other viewer characteristics that uniquely define a viewer may be recorded in the table 400. Further, values for viewer characteristics related to each viewer are shown for illustration purposes and may not be considered to be limiting the scope of the invention.

The column 402 associated with the column header 'Viewer Identifier' includes unique identifiers for viewer profiles of each viewer in the household who watches content on the TV 104. The column 404 depicts an age group of each viewer, the column 406 depicts a gender of each viewer watching content on the TV 104 and the column 408 depicts an average pitch value of each viewer. However, the viewer characteristics, such as viewer age and average viewer pitch, may change over time and such transitions are also captured and stored along with viewer profiles. In one embodiment, viewer characteristics of the viewer may be updated based on changes observed in viewer characteristics and a corresponding voice biometric may also be additionally stored. The column 410 is configured to store information related to voice biometrics of each viewer. On capturing a voice signal corresponding to a viewer, the voice biometrics of the viewer are extracted and compared with entries in the column 410 to identify the viewer watching the content on the TV 104. As an example, row 412 identifies a viewer as a 'male' with viewer identifier '05A0036', age between '40-50 years', and with an average pitch value of 85 Hz. Further, a voice biometric file 414 including a unique combination of speech feature values related to the viewer is stored in the column 410.

Referring now to FIG. 2, the memory module 154 may store a machine learning model configured to generate a probability score indicating a likelihood of the voice signal matching each voice biometric stored in a viewer profile. The machine learning model may use a combination of algorithms such as the Gaussian Mixture Model-Hidden Markov Model (GMM-HMM) system, Subspace GMM-HMM system (SGMM-HMM), Deep Neural Network HMM (DNN-HMM) system, Convoluted Neural Network (CNN), etc. In one illustrative example, an adult male (i.e., the viewer) may have provided a voice command to increase the volume level of the channel (e.g., a travel channel) currently being viewed. The voice command captured as a voice signal may be processed and mapped to a viewer profile (for example, viewer profile of a 20-year-old male with pitch values between 120-150 Hz) with the probability score of 0.9 indicating a high likelihood of being associated with the viewer profile that is already stored in the storage module 166. Further, the machine learning model may also be trained to generate a probability score that is indicative of the likelihood of the viewer being correctly classified into categories, such as male/female, different age groups, etc. In some cases, a TV viewer may create profiles with rich information such as names of individuals along with gender/age information. Such account profile information may also be stored in the storage module 166 and the viewer profiles may include names in addition to viewer IDs as shown in FIG. 4.

In at least one embodiment, the payload generator 160 is configured to receive viewer demographic data from the audio module 158 and channel tracking data from the channel tracking module 156. For example, the payload generator 160 may receive name of the viewer (e.g., John) from the audio module 158 and the type of the channel (e.g., Sports) that John was watching from the channel tracking module 156. Alternatively, the payload generator 160 may receive correlated channel tracking data and viewer demographic data from the audio module 158. For example, the payload generator 160 may receive combined information from the audio module 158 such as John aged 18 is watching sports channel. The channel tracking data in the payload may include, but is not limited to, a start time (i.e. a time at which the viewer started viewing the media content), a duration of viewing the media content, a media content identifier, and a frame number. The viewer demographic data may include information related to a number of viewers, viewer characteristics, and such other information corresponding to viewer(s) in relation to a particular content being displayed on the TV 104. The payload generator 160 is configured to generate a payload including the channel tracking data and the viewer demographic data. Such combined information is also referred to herein as 'enriched channel tracking data'. In at least some embodiments, a payload is generated in response to each detected predefined event. It is noted that in some embodiments, if no voice signal is detected in relation to the content being tracked, then the payload does not include any viewer information. Alternatively, the viewer information may include default information related to a viewer provided during account registration. In one embodiment, the default information can be information related to a viewer associated with a type of content displayed on the TV 104.

In at least one embodiment, the payload generator 160 is configured to provide the payload to the communication module 164. The payload includes the channel tracking data and the viewer demographic data. The communication module 164 is configured to generate a data packet encapsulating the payload and either provide the data packet to a communication interface of the STB 106 for transmission to a remote entity, such as for example, the LoRaWAN gateway, the LoRaWAN server or the remote server 118 shown in FIG. 1, using LoRaWAN protocol. The data packet includes fields corresponding to channel tracking data and the viewer demographic data. Alternatively, the communication module 164 may transmit the data packet from the STB 106 to the remote server, such as the LoRaWAN gateway, the LoRaWAN server, or the remote server. The use of LoRaWAN for transmission of channel tracking data addresses the cost concern, as the use of LoRaWAN as a transmission protocol is cheaper than using cellular/Wi-Fi protocols for transmission of channel tracking data. Moreover, the power consumed by the STB 106 is also drastically reduced on account of the use of LoRaWAN as a transmission protocol. An example configuration of the data packet is shown in FIG. 5.

Figure 5:
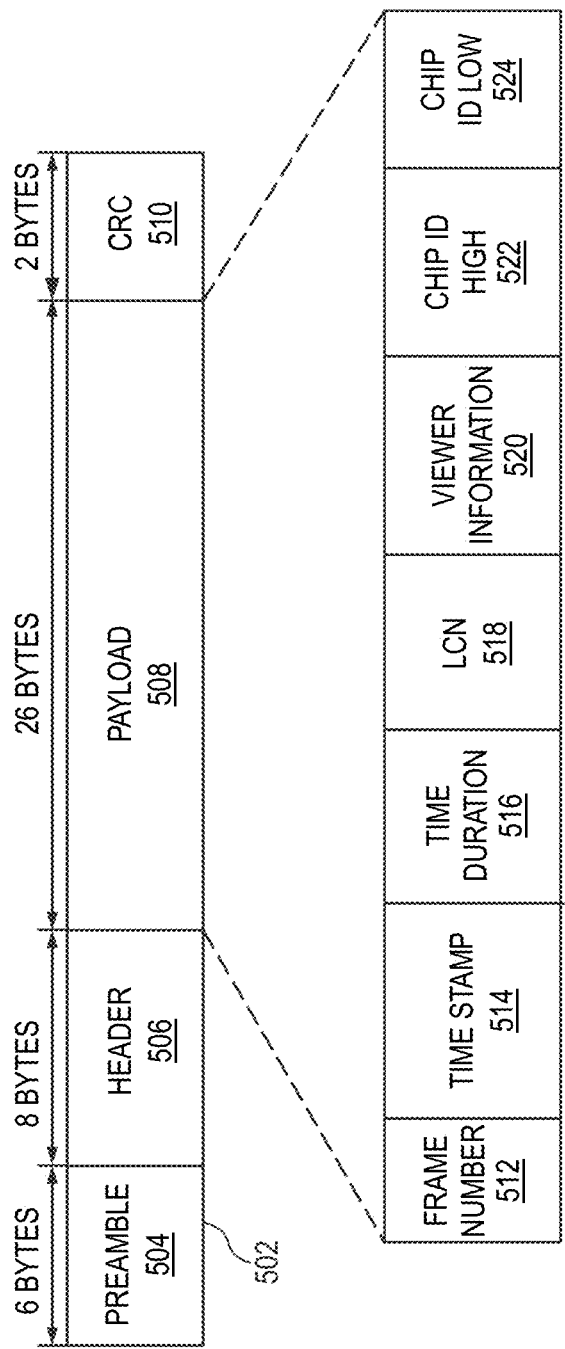
FIG. 5 depicts an example configuration of a data packet generated by a communication module of FIG. 2, in accordance with an embodiment of the invention.

Referring now to FIG. 5, a representation 500 is shown for illustrating an example configuration of a data packet 502 generated by the communication module 164 (shown in FIG. 2) of the system 150, in accordance with an embodiment of the invention. As explained with reference to FIG. 2, the communication module 164 generates a data packet in response to a payload provided by the payload generator 160. The payload may be generated in response to the event detected by the channel tracking module 156. The payload generated may include channel tracking data correlated with the viewer demographic data. For example, the payload includes name, age, and gender of the viewer, the channels that are of interest to the viewer and the channel viewing durations by the viewer, etc. In one example, the payload may include viewer details such as "John", "18", "Male", and channel tracking data such as "Sports Channel" and "2 Hours", where the payload indicates that John has watched sports channel for 2 hours. Further, advertisements can be customized to John based on the channel tracking data and viewer details. For example, the advertisements included in the broadcasted content provided to John can be replaced with sports related advertisements.

Accordingly, in FIG. 5, the communication module 164 is depicted to have generated the data packet 502 by encapsulating a payload 508 with additional data fields provided by the LoRaWAN protocol for proper data sequencing, error detection, and control, flow control, congestion control, routing information, etc. In this example representation 500, the data packet 502 includes data fields such as a preamble 504, a header 506, and a cyclic redundancy check (CRC) 510. It is understood that such fields may add a minimum level of overhead to the payload 508 and as such may not exceed the packet size restriction specified by the LoRaWAN protocol.

The field corresponding to the preamble 504 is configured to include a sequence of upchirps and downchirps with a specific symbol length (e.g., 12 symbol lengths) to keep a receiver of the remote server synchronized with incoming payload 508. In an illustrative example, 6 bytes may be assigned to include the symbols for the upchirps and downchirps related to the preamble 504. The field corresponding to the header 506 is configured to include information such as the number of bytes in the payload, the encoding rate, and whether to enable a payload CRC. It shall be noted that the header 506 is optional and enables disabling the field in situations where it is not necessary, for instance when the payload length, coding rate, and CRC presence are known in advance. In an illustrative example, 8 bytes may be assigned to include the information related to the header 506. The field corresponding to the CRC 510 is configured to include control bits to ensure that the payload 508 is received correctly. In an illustrative example, 2 bytes may be assigned to include the information related to the CRC 510.

The payload 508 is depicted to include channel tracking data along with viewer demographic data. More specifically, the payload 508 includes fields, such as a frame number 512, a time stamp 514, a time duration 516, a Landing Channel Number (LCN) 518, viewer information 520 corresponding to viewer demographic data, Chip ID High 522 and Chip ID Low 524.

The field corresponding to the frame number 512 is configured to include information related to a count of packets created from the time the STB 106 was last switched ON. In an illustrative example, 2 bytes may be assigned to include the information related to the frame number 512. The field corresponding to the time stamp 514 is configured to include information related to the time from which each channel was viewed. In an illustrative example, 8 bytes may be assigned to include the information related to the time stamp 514. The field corresponding to the time duration 516 is configured to include the time spent on each channel in seconds. In an illustrative example, 4 bytes may be assigned to include the information related to the time duration 516. The field corresponding to the LCN 518 is configured to include information related to each landing channel number. In an illustrative example, 4 bytes may be assigned to include the information related to the LCN 518. The field corresponding to the viewer information 520 is configured to include information such as, but not limited to, number of viewers, one or more viewer characteristics, and correlation data linking channel information with a viewer or viewer identifier related to one or more viewers. For example, the viewer information 520 may include that John and Ron were the viewers identified in a discussion prior to a channel switch from sports channel to a news channel. Further, viewer information 520 may include that John is aged 18 and Ron is aged 30. In an illustrative example, 4 bytes may be assigned to include the information related to viewer information 520. The field corresponding to the Chip ID High 522 is configured to include information related to the STB chip serial number identifier. In an illustrative example, 4 bytes may be assigned to include the information related to the Chip ID High 522. Similarly, the field corresponding to the Chip ID Low 524 is configured to include information related to the STB chip serial number identifier. In an illustrative example, 4 bytes may be assigned to include the information related to the Chip ID Low 524. The payload 508 generated in such a manner includes only 30 bytes. In some example embodiments, the payload size, as well as the configuration may be modified to enable transmission of the channel tracking data while limiting the packet size to adhere to limitations specified by the LoRaWAN protocol. For example, in some embodiments, the payload 508 may only include the LCN 518 and the time stamp 514 fields when voice signals are not detected by the audio module 158.

Referring now to FIG. 2, in one embodiment, the communication module 164 may provide the data packet to the communication interface, which may be embodied as a USB dongle capable of connecting to the STB 106 using a universal asynchronous receiver/transmitter (UART) interface. Further, the USB dongle is configured to transmit the data packets including enriched channel tracking data using LoRaWAN protocol to a remote entity. To this effect, the USB dongle may include a LoRaWAN chip for facilitating transmission and reception using the LoRaWAN protocol.

The remote entity, such as a remote server 118 (shown in FIG. 1) may maintain viewer profiles of viewers in a database. The channel tracking data and the viewer demographic data included in the data packets received from various STBs may be collated to generate viewership data, for example, viewership of a channel or Ad. Further, the generation of the viewership data is performed in real-time compared to the data provided by the government and private entities that publish the data weekly or monthly, or annually. Further, the data provided by these entities is extrapolated data in which viewership data is calculated for selected households and generalized for all the households based on the calculated viewership data. The viewership data provided by the system 150 is more accurate and is calculated for each household instead of prediction/extrapolation. Since the viewership data provided by the system 150 is accurate and in real-time, the viewership data facilitates the entities using such data to customize content and advertisements provided to the viewers in real-time. As such, the viewership data including demographic information may be used at least in part to customize its media content, customize Ads and advertising offerings for its customers (i.e., the individual viewers of the content) even at a household level.

Figure 6:
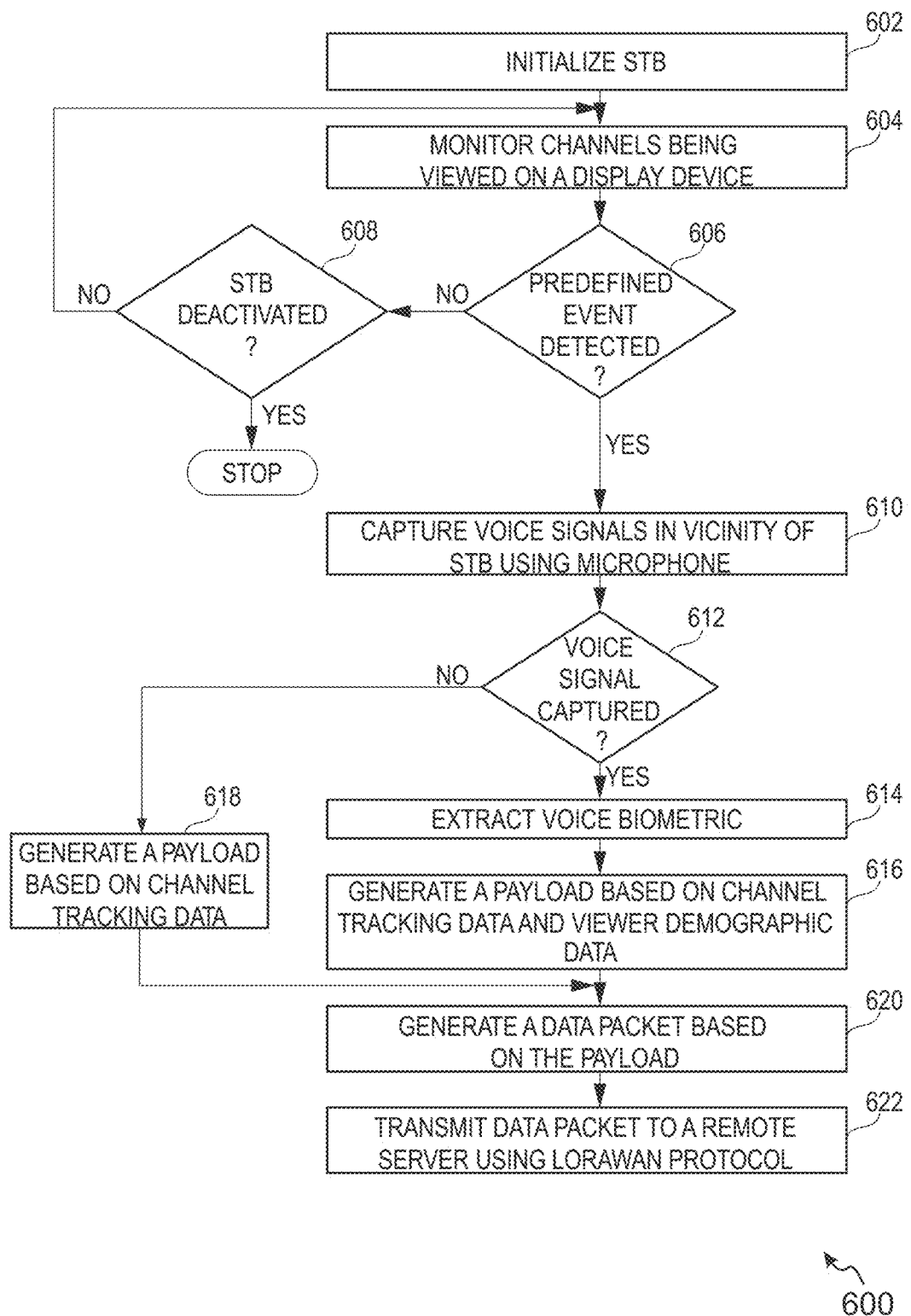
FIG. 6 shows a flow diagram for illustrating a process flow for obtaining channel tracking data from an STB, in accordance with an embodiment of the invention.

Referring now to FIG. 6, a flow diagram 600 is shown for illustrating a process flow for obtaining channel tracking data from an STB (such as STB 106), in accordance with an embodiment of the invention.

At 602, the STB is initialized. For example, the STB may be powered ON, or the STB may have exited a standby state/sleep mode for triggering the initialization process. The STB initialization includes booting the operating system. Subsequent to the completion of the booting process, the STB performs a check to determine if a communication module, such as the communication module 164 explained with reference to FIG. 2, is turned ON. When the viewer requests to view a channel, the STB first determines whether it has permission to view a particular channel. The STB then obtains permission from a CAS server, such as the CAS server 112 shown in FIG. 1 using ECM, and subsequent to obtaining the access, the STB decodes and tunes the channel. The channel may then be viewed by the viewer.

At 604, channels being viewed on a display device associated with the STB are monitored by the channel tracking module 156 (shown in FIG. 2) to detect occurrence of predefined events. For example, the channels are monitored by accessing channel information corresponding to the channels being viewed on the TV (such as TV 104) associated with the STB. The channel information includes information related to channel ID, channel name, category of the channel, and time duration of viewing the channel, etc. The channel information may be further used to determine occurrence of a predefined event.

At 606, it is detected whether a predefined event, such as a channel being viewed (without switching) for more than a threshold amount of time (e.g., one-two minute), a channel switching event, an STB ON/Reset, event and the like, has occurred or not. If no predefined event has occurred, then it is determined whether the STB has been deactivated or not at 608. If the STB is deactivated, the flow diagram 600 ends. If the STB is not deactivated, then the monitoring of the channels is continued at 604.

If a predefined event is detected, at 610, then the system 150 prompts a microphone such as the microphone 162 to capture voice signals in the vicinity of the STB at predefined intervals.

At 612, it is determined whether a voice signal is captured by the microphone 162. If a voice signal is captured, then at 614, voice biometric data is extracted from the voice signal and viewer information associated with the voice signal is identified using the audio module 158 (shown in FIG. 2). The viewer information may be identified as explained with reference to FIGS. 3 and 4 and are not explained again herein. The viewer information related to viewers viewing a particular channel on a TV constitutes viewer demographic data such as a number of viewers in the household viewing a particular channel, the age/gender information of the viewers, and the like. The viewer demographic data may be captured corresponding to each channel content being viewed on the TV in the household. If a voice signal is not captured by the microphone 162, then a payload is generated based on the channel tracking data at 616.

At 618, a payload is generated, by the payload generator 160 (shown in FIG. 2) based on the channel tracking data and the viewer demographic data.

At 620, a data packet is generated by the communication module 164 (shown in FIG. 2) based on the payload.

At 622, the data packet is transmitted to a remote server by the communication module 164 using the LoRaWAN protocol. The remote server may process the payload information (i.e. the enriched channel tracking data) of the data packet for selecting content or advertisements and customizing content for individual members of the household based on the viewer demographic data.

Figure 7:
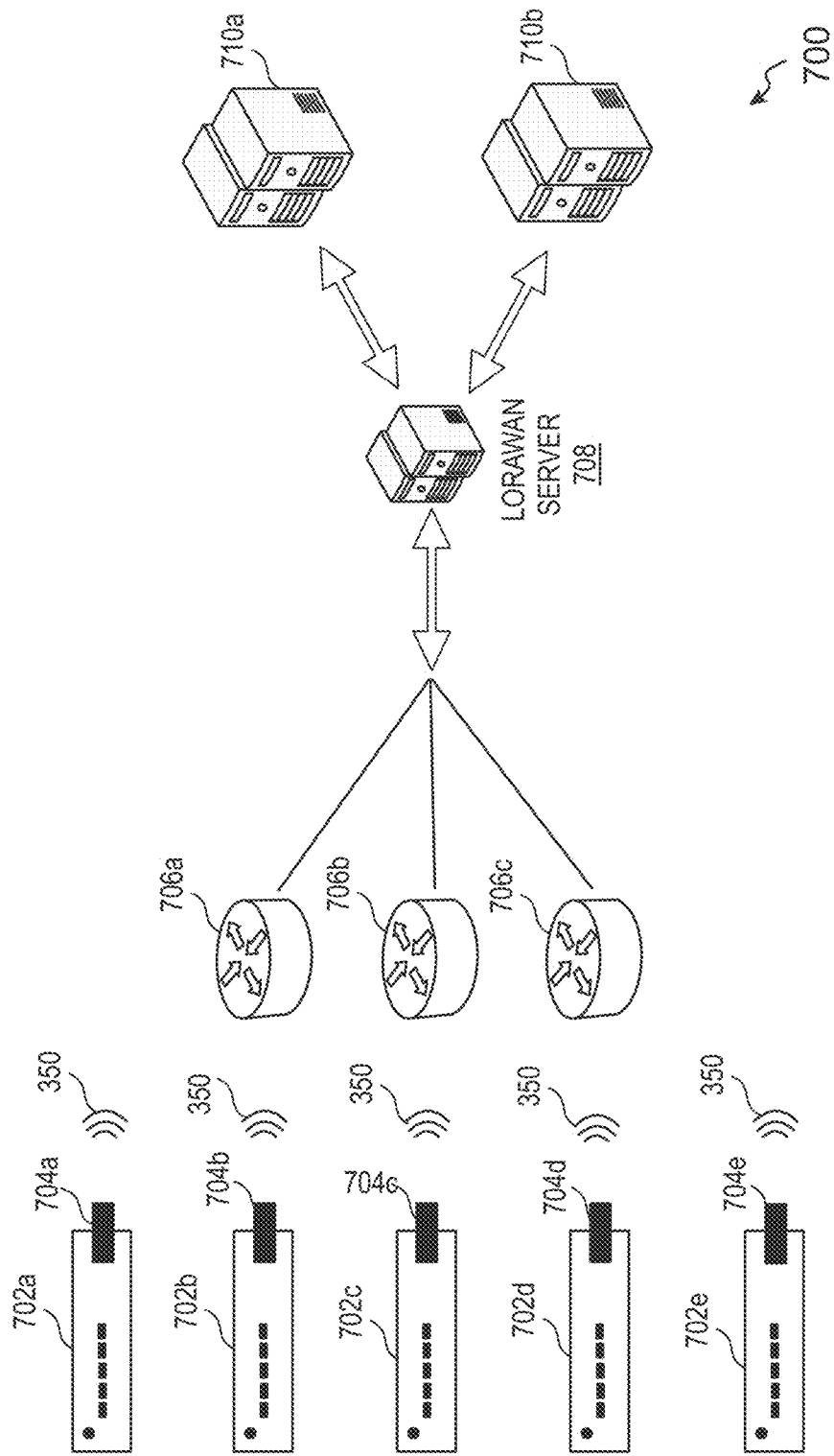
FIG. 7 depicts an example LoRaWAN architecture for facilitating communication of viewer demographic data, in accordance with an embodiment of the invention.

FIG. 7 shows a representation 700 for illustrating an example LoRaWAN architecture for facilitating communication of viewer demographic data, in accordance with an embodiment of the invention. As explained with reference to FIG. 1, transmission of channel tracking data enriched with viewer demographic data from an STB to a remote server, such as the remote server 118, is associated with the high cost and high power consumption, when conventional people meter-based solutions are used. 30 These factors limit the coverage of the audience measurement to a small scale. To perform viewership measurement at scale, LoRaWAN architecture as depicted in the representation 700 may be used.

The representation 700 depicts a plurality of STBs, such as a STB 702*a*, a STB 702*b*, a STB 702*c*, a STB 702*d* and a STB 702*c*. Each STB from among the STBs 702*a*-702*e* includes a system, such as the system 150 explained with reference to FIGS. 2 to 6. The system included within respective STBs is not shown in FIG. 7. A communication module in each system is shown to be embodied as a USB dongle in respective STBs. For example, the STB 702*a* is associated with a USB dongle 704*a*, the STB 702*b* is associated with a USB dongle 704*b*, the STB 702*c* is associated with a USB dongle 704*c*, the STB 702*d* is associated with a USB dongle 704d and the STB 702e is associated with a USB dongle 704c. Each USB dongle is configured to transmit data packets including channel tracking data and viewer demographic data using the LoRaWAN protocol (shown using radio waves 350) to nearest LoRaWAN gateways, such as a LoRaWAN gateway 706a, a LoRaWAN gateway 706b and a LoRaWAN gateway 706c. Each LoRaWAN gateway is a low power wide area network (LP-WAN) gateway. It is noted that the payload and the data packet are configured in such a manner that the size of each data packet does not exceed a predefined number of bytes (for example, 51 bytes). Moreover, the maximum number of data packets sent in uplink per day is less than a predefined number (for example, 144 data packets).

In some embodiments, the LoRaWAN gateways may use 3G/Ethernet backhaul to forward the channel tracking data in the form of data packets to a LoRaWAN server 708. Further, in some embodiments, the LoRaWAN server 708 may be configured to forward to one or more application servers, such as an application server 710a and an application server 710b.

Each application server 710a and 710b may be embodied as a decoder, a data processing server, an analytics server, and the like, and may be configured to process the viewer demographic data based on requirements provided by operators of the application servers 710a and 710b. Some non-limiting examples of the operators of the application servers 710a and 710b may include, but are not limited to advertisers, broadcasters, cable/DTH providers, production houses, media distributors, and the like. In at least one embodiment, the viewer demographic data may be processed to learn the behavior of viewers and accordingly the content of the channels and/or advertisements displayed on the channels may be customized. For example, if the content displayed on a general entertainment channel (GEC) has more female viewership as compared to a sports channel, the advertiser can customize the advertisements provided on the GEC to be more female-centric. Moreover, the customization may be performed at an individual level too. For example, if an individual subscriber of the cable/DTH provider spends more time watching sports channel, then the cable/DTH provider may offer the subscriber attractive package deals on bulk subscriptions 5 of multiple sports channels.

A method for obtaining channel tracking data from an STB is explained next with reference to FIG. 8.

Figure 8:
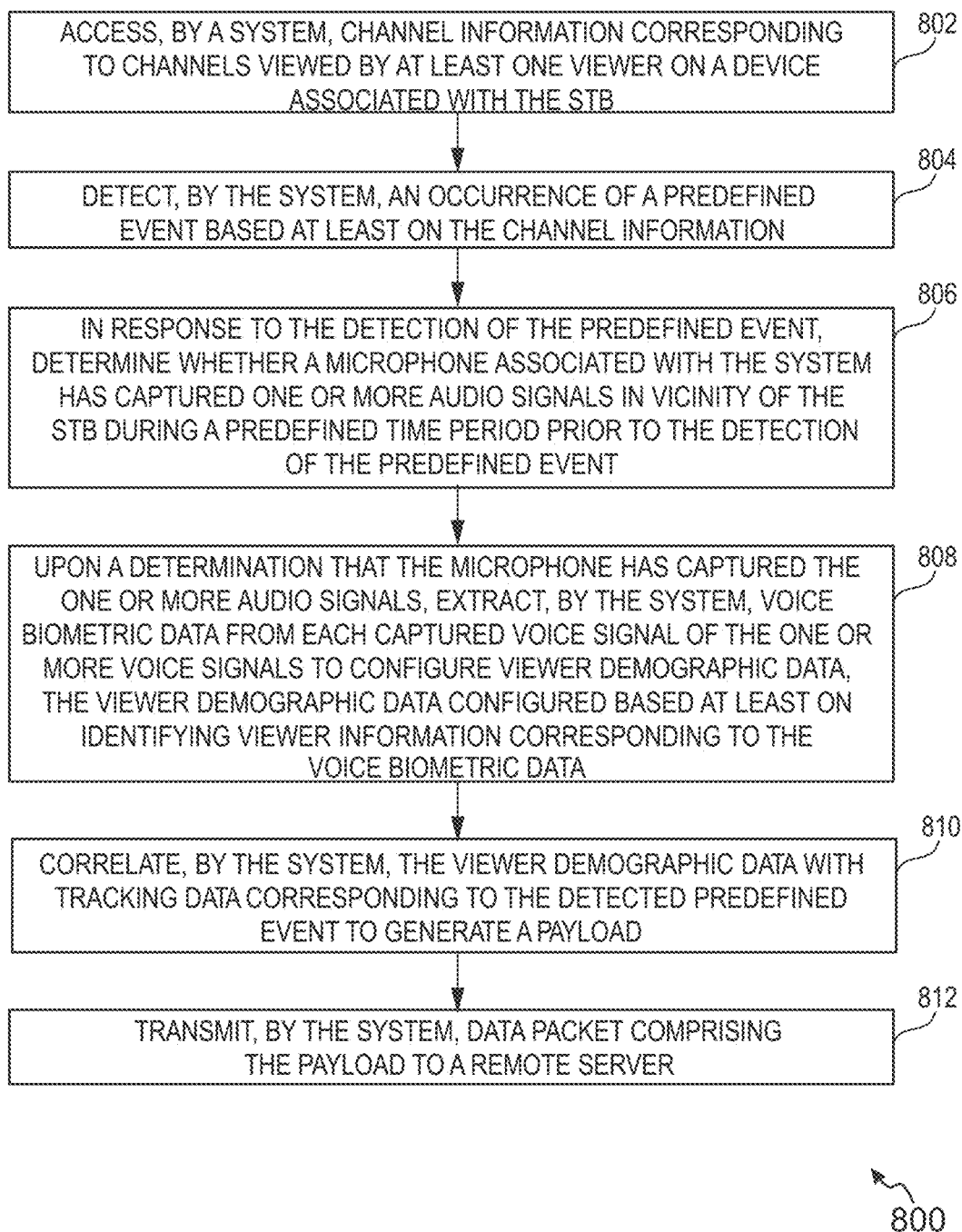
FIG. 8 shows a flow diagram of a method for obtaining channel tracking data from an STB, in accordance with an embodiment of the invention.

FIG. 8 shows a flow diagram of a method 800 for obtaining channel tracking data from an STB, in accordance with an embodiment of the invention. The various steps and/or operations of the flow diagram, and combinations of steps/operations in the flow diagram, may be implemented by, for example, hardware, firmware, a processor, circuitry, and/or by a system such as the system 150 explained with reference to FIGS. 2 to 3 and/or by a different device associated with the execution of software that includes one or more computer program instructions. The method 800 starts at operation 802.

At operation 802 of the method 800, channel information corresponding to channels being viewed by at least one viewer on a display device associated with a set-top box (STB) is accessed by a system such as the system 150 explained with reference to FIGS. 2-5. The channel information can be information related to the channel being viewed on the display device, such as a channel name, a category of the channel (e.g., entertainment, sports, news), and content displayed on the channel, etc.

At operation 804 of the method 800, an occurrence of a predefined event is detected based at least on the channel information. For example, the system detects that a channel switch has occurred at the STB based on the accessed channel information. The channel information changes when the viewer changes a channel displayed on TV through a remote or other means. In one example, the change in the channel information will be identified as occurrence of the predefined event.

At operation 806 of the method 800, upon detection of the predefined event, it is determined by the system whether a microphone associated with the system has captured one or more voice signals in vicinity of the STB during a predefined time period prior to a time at which the predefined event is detected.

At operation 808 of the method 800, upon a determination that the system has captured the one or more voice signals, voice biometric data is extracted from each captured voice signal of the one or more voice signals to configure viewer demographic data, where the viewer demographic data is configured based at least on identifying viewer information corresponding to the voice biometric data.

At operation 810 of the method 800, the viewer demographic data is correlated with channel tracking data corresponding to the detected predefined event by the system. The viewer demographic data is correlated with the channel tracking data to generate a payload.

At operation 812 of the method 800, the data packet including the payload is transmitted to a remote server by the system.

Various embodiments disclosed herein provide numerous advantages. More specifically, the embodiments disclosed herein suggest techniques for solving the problem of scaling viewership measurement at individual households while reducing the cost and power consumption in STBs. More specifically, the channel tracking data captures demographic information (i.e., viewership associated with individual viewers of the household) for selecting and provisioning content for viewers in a household based on the demographic information. As explained with reference to various embodiments, the usage of LoRaWAN in obtaining channel information from STBs not only reduces cost but also reduces the power consumption involved in transmission of data packets between the STB and a remote processing server. Moreover, the various limitations of LoRaWAN are also overcome, thereby enabling secure transmission of channel tracking data enriched with viewer demographic data from the STB to the remote server.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A method for obtaining enriched channel tracking data from a set-top box, STB, the method comprising:
   accessing, by a system, channel information corresponding to channels viewed by at least one viewer on a display device associated with the STB;

detecting, by the system, an occurrence of a predefined event based at least on the channel information;

in response to the detection of occurrence of the predefined event, determining whether a microphone associated with the system has captured one or more audio signals in vicinity of the STB during a predefined time period prior to the detection of the predefined event;

upon a determination that the microphone has captured the one or more voice signals, extracting, by the system, voice biometric data from each captured voice signal of the one or more voice signals to configure viewer demographic data, the viewer demographic data configured based at least on identifying viewer information corresponding to the voice biometric data;

correlating, by the system, the viewer demographic data with channel tracking data corresponding to the detected predefined event to generate a payload; and transmitting, by the system, a data packet comprising the payload to a remote server.

2. The method as claimed in claim 1, further comprising upon a determination that the microphone has not captured the one or more audio signals, triggering, by the system, the microphone to capture the one or more voice signals in vicinity of the STB at a time of the detection of the predefined event.

3. The method as claimed in claim 1, wherein the viewer demographic data comprises information related to a number of viewers viewing a respective channel being displayed on the display device, characteristics of each of the at least one viewer, preferences of each of the at least one viewer regarding time slots for viewing a channel.

4. The method as claimed in claim 1, wherein the predefined event comprises one of a channel being viewed for more than a threshold amount of time, a channel switching event, and an STB ON or reset event.

5. The method as claimed in claim 1, wherein the extracting comprises processing each captured voice signal to identify viewer information in relation to a channel being viewed on the display device.

6. The method as claimed in claim 5, wherein processing each captured voice signal comprises removing background noise from each captured voice signal.

7. The method as claimed in claim 6, wherein processing each captured voice signal further comprises amplifying each captured voice signal, upon removing the background noise.

8. The method as claimed in claim 7, wherein processing each captured voice signal further comprises extracting speech features from each captured voice signal to determine the voice biometric data.

9. The method as claimed in claim 1, further comprising comparing the voice biometric data with biometric data corresponding to one or more viewer profiles stored in a viewer profile pool; and determining a viewer of the channels based on a match between the voice biometric data and the biometric data.

10. The method as claimed in claim 9, further comprising creating a new viewer profile when there is no match between the voice biometric data and the biometric data; and storing the new viewer profile associated with the voice biometric data in the viewer profile pool.

11. The method as claimed in claim 1, wherein correlating the viewer demographic data with the channel tracking data comprises generating the payload comprising the viewer demographic data and the channel tracking data.

12. A system for obtaining channel tracking data from a set-top box, STB, the system comprising:

one or more computer processors; and a computer-readable storage medium comprising instructions for controlling the one or more computer processors to be operable for:

access channel information associated with channels viewed by at least one viewer on a display device associated with the STB;

detect an occurrence of a predefined event based at least on the channel information;

in response to the detection of occurrence of the predefined event, determine whether a microphone associated with the system has captured one or more voice signals in vicinity of the STB during a predefined time period prior to the detection of the predefined event;

upon a determination that the microphone has captured the one or more voice signals, extract voice biometric data from each captured voice signal of the one or more voice signals to configure viewer demographic data, the viewer demographic data configured based at least on identifying viewer information corresponding to the voice biometric data;

correlate the viewer demographic data with the channel tracking data corresponding to the detected predefined event to generate a payload; and transmit a data packet comprising the payload to a remote server.

13. The system as claimed in claim 12, wherein the microphone is configured to be in an ON state after switching ON the STB till the STB is switched OFF.

14. The system as claimed in claim 12, wherein the microphone is configured to be in an ON state for a time interval after detecting the occurrence of the predefined event.

15. The system as claimed in claim 12, wherein the viewer demographic data comprises information related to a number of viewers viewing a respective channel being displayed on the display device, characteristics of each of the at least one viewer, preferences of each of the at least one viewer regarding time slots for viewing a channel.

16. The system as claimed in claim 12, wherein the predefined event comprises one of a channel being viewed for more than a threshold amount of time, a channel switching event, and an STB ON or reset event.

17. The system as claimed in claim 12, further operable to store one or more viewer profiles of the at least one viewer of the display device, wherein each viewer profile comprises information related to characteristics of a viewer and voice biometric data of a viewer.

18. The system as claimed in claim 12, wherein, to extract the voice biometric data, the instructions are further operable to:

remove background noise from each captured voice signal;

amplify each captured voice signal, upon removing the background noise; and extract speech features from each captured voice signal to determine the voice biometric data.

19. The system as claimed in claim 18, wherein the instructions are further operable to compare the voice biometric data with biometric data corresponding to one or more viewer profiles stored in a viewer profile pool; and determine a viewer of the channels based on a match between the voice biometric data and the biometric data.

20. The system as claimed in claim 19, wherein the instructions are further operable to create a new viewer profile when there is no match between the voice biometric data and the biometric data; and store the new viewer profile associated with the voice biometric data in the viewer profile pool.

\* \* \* \* \*